United States Patent
Umeda et al.

(10) Patent No.: US 7,618,193 B2
(45) Date of Patent: Nov. 17, 2009

(54) ROLLING BEARING INCORPORATED IN AUXILIARY DEVICE FOR INTERNAL COMBUSTION ENGINE

(75) Inventors: Atsushi Umeda, Okazaki (JP); Tsutomu Shiga, Nukata-gun (JP); Kouichi Ihata, Okazaki (JP)

(73) Assignee: Denso Corporation, Kariya (JP)

(*) Notice: Subject to any disclaimer, the term of this patent is extended or adjusted under 35 U.S.C. 154(b) by 353 days.

(21) Appl. No.: 11/404,767

(22) Filed: Apr. 17, 2006

(65) Prior Publication Data

US 2006/0233478 A1    Oct. 19, 2006

(30) Foreign Application Priority Data

Apr. 15, 2005   (JP) .............................. 2005-118391

(51) Int. Cl.
*F16C 19/00* (2006.01)

(52) U.S. Cl. ...................................... 384/490; 384/450

(58) Field of Classification Search ................ 384/490, 384/450, 513, 516, 517
See application file for complete search history.

(56) References Cited

U.S. PATENT DOCUMENTS

| | | | |
|---|---|---|---|
| 5,150,974 A | 9/1992 | Tamada et al. | |
| 6,793,397 B2 * | 9/2004 | Ishiguro et al. | ............. 384/450 |
| 6,830,137 B2 | 12/2004 | Fujiwara | |
| 7,168,539 B2 | 1/2007 | Fujiwara | |
| 2002/0085780 A1 | 7/2002 | Muraki et al. | |

FOREIGN PATENT DOCUMENTS

| | | |
|---|---|---|
| DE | 26 30 035 B2 | 1/1978 |
| DE | 102 60 904 A1 | 7/2004 |
| JP | A 02-190615 | 7/1990 |
| JP | B2 06-089783 | 11/1994 |
| JP | A-10-159579 | 6/1998 |
| JP | A 2003-49837 | 2/2003 |
| JP | A 2003-65326 | 3/2003 |
| JP | A 2003-74672 | 3/2003 |
| JP | A 2003-230248 | 8/2003 |
| JP | A 2003-329034 | 11/2003 |
| JP | A-2004-169883 | 6/2004 |
| JP | A 2004-183765 | 7/2004 |
| JP | A 2005-180668 | 7/2005 |
| JP | A 2005-321007 | 11/2005 |

OTHER PUBLICATIONS

Eschmann, et al. "Die Wälzlagerpraxis: Handbuch für die Berechnung und Gestaltung von Lagerungen," *Oldenbourg*, pp. 62-63, Munchen, 1978.
Translation of Official Letter Issued by the German Patent and Trademark Office, Official File No. 10 2006 018 109.3-12, pp. 1-3, Nov. 30, 2006.
Notification of Reasons for Rejection, Patent Appl. No. 2005-118391, Oct. 7, 2008, pp. 1-2.

* cited by examiner

*Primary Examiner*—Thomas R Hannon
(74) *Attorney, Agent, or Firm*—Oliff & Berridge, PLC

(57) ABSTRACT

A rolling bearing is adapted for an auxiliary device driven by an internal combustion engine via a belt. The rolling bearing comprises an inner race, an outer race, and a plurality of rolling elements disposed between the inner race and the outer race for rolling capabilities. A substantially half of a tolerance value of a clearance in a radial direction of the rolling bearing falls in a negative value, under a condition where the rolling bearing is mounted in the auxiliary device.

13 Claims, 12 Drawing Sheets

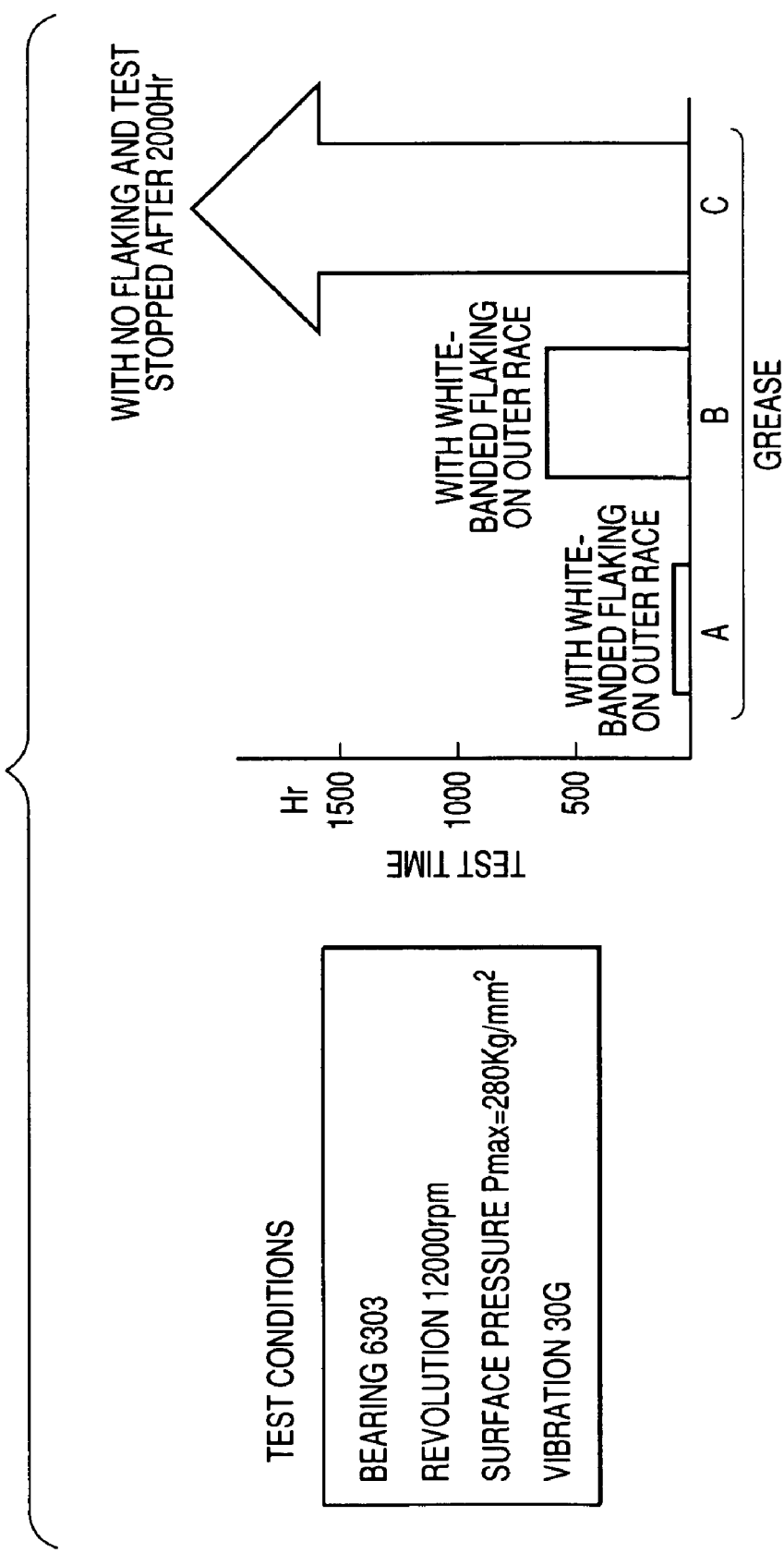

FIG. 11

TABLE 1 LIST OF GREASE USED IN TEST

| GREASE | | A | B | C |
|---|---|---|---|---|
| THICKNER | | DIUREA | FLUOROETHYLENE | DIUREA |
| BASIC OIL | KIND | OLEFIN | FLUOROETHER | PHENYLETHER |
| | DYNAMIC VISCOSITY mm²/sec | 56 | 160 | 98 |
| EXTREME-PRESSURE ADDITIVE | | ----- | SbDTC | SbDTC |

FIG. 12

TABLE 2 RADIAL CLEARANCE IN ROLLING BEARING

| ITEM | | DIMENSIONAL FACTORS |
|---|---|---|
| CLEARANCE ($\mu$m) BETWEEN OUTER RACE AND HOUSING | | 7~-20 (INTERFERENCE) |
| CLEARANCE ($\mu$m) BETWEEN INNER RACE AND ROTARY SHAFT | | 14~-2 (INTERFERENCE) |
| INTERNAL CLEARANCE ($\mu$m) IN SINGLE BEARING | | 11~4 |
| RADIAL CLEARANCE ($\mu$m) AFTER ASSEMBLY | NORMAL TEMP. | 11~-5 (INTERFERENCE) |
| | HIGH TEMP.* | 11~2 |

* HIGH TEMP.

(TEMP. CORRESPONDING TO 90°C AROUND ALTERNATOR)

HOUSING: 150degC

OUTER RACE: 160degC

INNER RACE: 170degC

ROTARY SHAFT: CALCULATED AT 180degC

FIG. 13

TABLE 3 RADIAL CLEARANCE IN ROLLING BEARING

| ITEM | | DIMENSIONAL FACTORS |
|---|---|---|
| CLEARANCE (μm) BETWEEN OUTER RACE AND HOUSING | | 19~-8 (INTERFERENCE) |
| CLEARANCE (μm) BETWEEN INNER RACE AND ROTARY SHAFT | | 4~-12 (INTERFERENCE) |
| INTERNAL CLEARANCE (μm) IN SINGLE BEARING | | 0~7 |
| RADIAL CLEARANCE (μm) AFTER ASSEMBLY | NORMAL TEMP. | 7~-10 (INTERFERENCE) |
| | HIGH TEMP.* | 7~-8 (INTERFERENCE) |

ROLLING BEARING INCORPORATED IN AUXILIARY DEVICE FOR INTERNAL COMBUSTION ENGINE

CROSS-REFERENCE TO RELATED APPLICATION

This application is based on and claims the benefit of priority from earlier Japanese Patent Application No. 2005-118391 filed on Apr. 15, 2005, the description of which is incorporated herein by reference.

BACKGROUND OF THE INVENTION

1. Field of the Invention

The present invention relates to rolling bearings for use in an auxiliary device such as an alternator or the like mounted on an internal combustion engine (engine) and, more particularly, to a technology of preventing brittle flaking (white-banded flaking) of a rolling bearing.

2. Description of the Related Art

Rolling bearings for auxiliary devices such as an alternator of an automotive engine, an air conditioning unit and idler pulleys have heretofore been used in the past under severe conditions involved in vibrations and temperatures. This results in the elicitation of flaking in the rolling bearings due to a change of tissues in new modes. This flaking occurs in any area of an outer race, an inner race and a rolling element (ball or roller) of the rolling bearing under a feature that is different from a usual rolling fatigue life encountered in the related art. Once such a phenomenon occurs, flaking occurs for a very short of time (a time interval of approximately $\frac{1}{100}$ to $\frac{1}{1000}$ times that of the related art). In observed tissue of a flaked area after etching with nital liquid (nital alcoholic solution), as done in the observation of the fatigue life in the related art, the flaked area has features with the tissues seemed not to be dark (in so-called DEA: Dark Etching Area) but instead a white layer (in a so-called WEA: White Etching Area).

In a bearing industry, it is a usual practice for this flaking to be referred to as "brittle flaking" or "white-banded flaking" in order to be distinguished from the related art fatigue life. In a rolling life test conducted so as to cause the occurrence of flaking using the related art fatigue test, a whole of component elements of a rolling bearing undergoes fatigue breakdown in a final stage. In contrast to such fatigue breakdown, no mechanism of the occurrence of brittle flaking is made clear yet and such flaking shows specific properties with breakage taking place depending on recurrence test conditions under which flaking takes place for an extremely short period of time whereas under a condition with no occurrence of breakage, brittle flaking does not occur. Therefore, attempt has heretofore been made in the past to address such an issue through merely temporary treatment conducted with no clear scientific grounds and in such a status, no full-fledged measures can be taken under current conditions.

Such a mechanism is explained on presently accepted hydrogen theory. This is a theory in that when a ball is caused to slip due to stress such as vibration during use thereof causing grease to be decomposed due to heat or pressure developments for generating hydrogen, which in turn causes hydrogen brittleness to occur with the resultant occurrence of flaking. Various proposal have heretofore been made with a view to suppressing the separation of hydrogen from grease or providing a rolling surface coated with an oxide film so as to shut off the entry of generated hydrogen into steel of a rolling bearing for thereby suppressing the occurrence of flaking based on such theory as disclosed in Japanese Patent Publication No. 6-89783. However, experimental test results obtained by the present invention have not necessarily demonstrated a solution to the issue of preventing the occurrence of flaking. Also, upon recurrence tests conducted under another condition different from that under which an effective result is obtained, no advantageous effect has been obtained but rather a worse phenomenon has appeared. Although in a case where a rolling bearing is made up of component elements made of steel forcedly added with hydrogen in advance, white-banded flaking surely affects the rolling bearing for a short period of time even if most of tests have been conducted under any conditions. No conclusion has been obtained in normal operation of the rolling bearing in that grease is decomposed into hydrogen for penetration into steel to cause the occurrence of white-banded flaking due to hydrogen brittleness.

Further, the present inventor has conducted a test using ball bearings under a condition shown in FIG. 1 to demonstrate such a phenomenon on the ball bearings in a more reliable manner. With the test, three kinds of greases were employed in the ball bearings, respectively, as indicated on Table 1 shown in FIG. 11. Greases A and C include compounds having hydrogen radical and grease B includes grease of fluorine series with no hydrogen radical.

The test condition is illustrated in FIG. 1 and has been properly conducted under a condition with no entry of moisture into the ball bearings from an outside. According to the hydrogen theory, white-banded flaking would not occur on the ball bearing with grease B, but white-banded flaking has eventually occurred on this ball bearing. Also, this flaking has occurred for a shorter time interval than that for which flaking had occurred on the ball bearing with grease C having hydrogen radical. (However, it is likely that there is an effective sequence opposite to that of FIG. 1 depending on a test condition. Now, what the inventor desires to state a fact that white-banded flaking has actually occurred on the ball bearing even with grease B with no inclusion of hydrogen radical.) That is, it is concluded that hydrogen is not the cause of white-banded flaking.

Due to the presence of strong impression on test results (with hydrogen brittleness) conducted on the bearings each with the rolling surface forcedly added with hydrogen, the favorable test results appearing by chance have been mistaken to be a hydrogen ingress prevention effect resulting from the formation of the oxide film on the rolling surface. In other word, although it is hard to deny a possibility in that hydrogen constitutes just a little bit accelerating factor, hydrogen is not a main factor for the occurrence of white-banded flaking.

In fact, even with a real machine test conducted on an automobile on which bearings taking measure based on such a theory, flaking has occurred on the bearings. Recurrence tests, conducted by the present inventor, have come to a conclusion in that those of the bearings encountered with white-banded flaking, resulting not from hydrogen but from some reason (other than hydrogen), have included some of the bearings in which hydrogen is eventually observed in steel. That is, this has resulted from confusion made between causes and errors.

As a further mechanism, an attempt is made to use a stress theory (an oscillation theory in terms of stress). That is, this concept is an idea to explain flaking in terms of the stress side. Such a concept similarly results in contradiction in which it becomes hard to distinguish the occurrence of a common fatigue life (accompanied by DEA) based on stress (shear). Moreover, the present inventor has determined the fact, upon various researches conducted on stress acting on the bearings, in that among those of the bearings encountered with flaking in the real machine (automobile) test, some of the bearings are encountered with white-banded flaking when the load, acting on the bearing, clearly drops to 0 Kg when a belt tension is zeroed (becomes less than 0 Kg) due to adverse affect resulting from an inertial force during deceleration of the engine under a condition in which the belt tension remains at a low level. There is no way for the stress theory to explain such an exemplary case. Although other explanations are herein omitted, the stress theory has the same contradiction as that of the hydrogen theory discussed above and, therefore, white-banded flaking stills occur on bearings installed on a real machine for which measures have been taken based on such a theory.

As set forth above, any mechanism propounded in the related art for the occurrence of brittle flaking does not satisfy the current condition and still remains to be unclear about what is a stress factor among other factors of a real machine and how the stress factor gives adverse affect on the bearing. Therefore, there is a situation under which no measure is taken to address the issues. Further, modern engines have heretofore been widely incorporating serpentine type belt drive systems with each including a single belt for driving a large number of pulleys with a view to structuring the engine in a small size with lightweight. Such a belt drive system has encountered with various issues such as an increase in tension of a belt, a resonance on the belt and enhanced engine oscillations. Thus, stress acting on the bearings has been increasingly complicated. No measure has been taken to address even such issues. Especially, among the auxiliary devices installed on the automobile, an alternator is a typical unit in which flaking occurs in the bearing at an increased rate as compared to the bearings of the other the auxiliary devices. Even though the bearings constitute important mechanical component parts, no full-fledged measure has been taken to address the issue of the occurrence of brittle flaking in a rolling bearing and the rolling bearing is still left under a situation where even no occurrence mechanism has been established.

As mentioned above, despite the occurrence of brittle flaking causes extremely shortened life as compared to a commonly occurring fatigue life (for instance, no fatigue life has been serious issues on an alternator in actual practice), no mechanism for explaining such a phenomenon has been established and no proper measures have been taken. With no alternatives, attempts have heretofore been taken to use an inefficient method wherein inconsistent measures have been taken for respective auxiliary devices to confirm results on tests of the auxiliary devices. Therefore, wasteful efforts have been conducted unnecessarily increasing a size or precision of the bearing and even with such efforts, such problems cannot be fully addressed.

SUMMARY OF THE INVENTION

The present invention has been completed with a view to addressing the above issues upon clarifying a mechanism for brittle flaking to take place on a rolling bearing and has an object to provide a rolling bearing for which correct and simple measures are taken.

To address the above issues, the present inventor has attempted to reconsider a method of achieving recurrence of brittle flaking upon getting back to an original starting point. For the recurrence of flaking on the bearing in the related art practice, tests have been conducted on the bearing by imparting large stress such as high load, high speed rotation and vibration at a high magnitude (may be due to an influence arising from a general fatigue life) with a view to causing the recurrence of white-banded flaking on the bearing. But, attention is focused on a fact in that flaking occurs even under a seemingly featureless condition (with load of 0 Kg) in the real machine as mentioned above. That is, consideration has been taken to obtain some kinds of hints by faithfully simulating the engine conditions. As a result, it has been considered to utilize the characteristics of the engine that are not considered in the related art recurrence test.

With commonly used internal combustion engines, fluctuations are liable to occur in rotations of the internal combustion engines in the form of rotational fluctuations and ripple rotations due to individual explosions in the number of engine cylinders. In order to verify the relationship between a rolling bearing and the engine, tests have been conducted using an alternator applied with ripple rotations at an average rotating fluctuation rate of 2% (that is a quite natural rotating fluctuation rate in the actual engine wherein the fluctuation marks a value greater than 30% in the vicinity of an idling speed) in the order (corresponding to an order of the engine) two times the rotating speed of the engine by controlling an electric motor in order to simulate an actual four-cylinder engine.

A simplified diagram of a test machine and a related rotating speed pattern is illustrated in FIG. 2A. An alternator carrying thereon a bearing (of Type: 6202) was set in a test machine in a structure driven by an electric motor via a belt nearly in the same mode as the internal combustion engine in a manner mentioned above. The belt was tensioned between the electric motor and the alternator so as to induce a resonance on the belt in a lateral direction (a direction of a chord) of the belt during operation of the electric motor at speeds in high and low ranges. For other test conditions, the bearing was held under entirely ordinary stress "with no vibration and no load at normal temperatures". (It's a matter of course that when installed on an engine, a bearing encounters extremely large stresses (such as those including bearing load of 150 Kg, acceleration in a range from 20 to 30 G, temperatures in a range of 100° C. with an alternator loaded with 50 A) and also a belt has various types of resonances.)

Thus, this test condition has extremely lower stress than that of an actual engine and represents a condition with no factors on temperatures, a fixed load, a fluctuating load and vibration whereby no brittle flaking seems to take place on the bearing according to the stress theory of the related art practice. The related art hypotheses (on both of the hydrogen theory and stress theory) are inclined to rely on an emphasis on loads and, hence, recurrence tests have been conducted in the related art practice on a tendency with the bearing applied with large loads and a large magnitude of vibrations. However, the current test has been conducted in daring with a view to clarifying a mechanism for flaking to occur on a bearing by decreasing stress that has been emphasized on the related art recurrence tests.

As a result, after an elapse of a mere 450 hours from a start of the test, so-called brittle flaking with a white-banded layer has appeared in one of eight balls incorporated in a bearing mounted on a front (pulley) side. That is, it is clear that white-banded flaking has taken place on the ball of the bearing even under a quite common condition that has not been absolutely considered in the related art theories.

Also, to take a closer look on such a white-banded layer, the white-banded layer has revealed other various features. A photograph of a rolling surface formed on an inner race is exemplarily shown in FIG. 2B. An impression mark (in the form of a dent) was observed on the rolling surface in an osculating ellipse pattern with a major axis of 2.6 mm (due to the photograph being taken in an oblique direction, the impression mark was observed in a crescentic form due to an influence of a curvature factor). The ellipse formed on a central area seems to have a minor axis of approximately 0.32 mm even though such an area is hard to be observed due to an affect of the rolling of the ball. The rolling surface had eleven areas formed with other impression marks with substantially the same size as that observed above and oriented at random angles. It's not surprising that an inner race track was formed with a normal rolling track resulting from the rolling of the balls in a circumferential direction with a width of approximately 2.8 mm (due to rotations of the balls on the inner race, the rolling track was observed in the same width in all circumferences with a volume being substantially coincident with a major axis of an osculating ellipse calculated based on a bearing load condition). Although an impression mark in an osculating ellipse with the same size as that of the inner race was observed on the ball surface with non-occurrence of flaking, no impression mark was observed on a rolling track of an outer race on which a normal ball rolling-track is formed.

Upon detailed analysis conducted on the osculating ellipse area, extreme-pressure additive with grease remaining in a break down form was observed with a damaged area converted in an oxidized state. An overall picture of the bearing subjected to the test is shown in FIG. 3A, showing a stress condition, and FIG. 3B showing an exploded view on a research result subsequent to the occurrence of flaking. (With a rear bearing 6002), numerous ellipse-shaped impression marks were observed on all of an inner race, an outer race and balls but these marks are not the type of clear dents, like those appeared in the front bearing, and observed in level of contact marks. Also, no occurrence of flaking is observed and description of the same is herein omitted).

Further, description is made of a, conclusion of the relationship between a feature of the result of the present recurrence test and a mechanism introduced from such a result.

The front baring has supposed to have the following features:

Fact 1: White-banded flaking has occurred on a ball.

Accordingly, this recurrence method represents a recurrence test arising from low stress that is different from that employed in the recurrence method of the related art practice.

Fact 2: No vibration is imparted to the bearing and load applied to the bearing was low.

Accordingly, it is clear that no flaking was caused on the bearing due to factors including a force (Kg) and pressure (Kg/mm2) (This means that flaking has occurred not because of the dimension of force).

Fact 3: "Dents" have occurred on an inner race and a ball of the bearing, respectively, with no formation of a dent on an outer race.

These facts reveal that stress has acted not on a contact area between the outer race and the ball but only on a "contact area (on a surface of the inner race) between the inner race and the ball". (Supposing stress was applied on the bearing under normal load, a force component acted on the inner race is deemed to have acted on the outer race via the balls and a dent must be left on the outer race to some degree or another, but no dent was observed on the outer race in the current recurrence test). That is, it can be conceived that stress, deemed to have acted merely on the inner race and the ball, was caused by collision. It is estimated that due to collision between the inner race and the ball, the "dent" has occurred in a permanently deformed status by which white-banded flaking has been caused to occur. (This means that if the bearing encounters collision, the dent is formed on only one of the inner race and the outer race depending on whether the ball is brought into collision with the inner race or the outer race).

Fact 4: Although the "dent" disappears at a central area, the dent appears in an entirely ellipse shape.

Accordingly, it is concluded that the dent is deemed to have occurred not in the form of a pseudo impression mark resulting from shuttle-wise micro-motion of the ball but in the form of a mark caused by frontal collision between the inner race and the ball occurring in a radial direction thereof.

Fact 5: A running mark (a trace under normal operation) and "dents (abnormal trace areas under permanently deformed patterns) between the ball and the inner race" are formed in osculating ellipses whose major axes are nearly equal to each other (with the presence of the fact "that the major axes are equal to each other" representing that the inner race and the balls are subjected to wears with the same amounts of deformation during application of stress as shown in FIG. 4).

Consequently, when subjected to the same amounts of deformation, strains are deemed to have occurred on the inner race and the ball of the bearing in an elastic deformation region during normal operation and a plastic deformation region during abnormal operation. (Although the deformation may be considered in terms of stress instead of deformation, due to consideration made in terms of strain in the result of the Fact 2 and plastic deformation, the deformation is considered in terms of strain).

Fact 6: The "dent" portion was formed in a rusted-out condition (with deterioration occurring in the additive).

Accordingly, (with the inner race and the ball being deformed with the same amounts of deformations when applied with stress) the inner race and the ball bear the substantially same contact pressures. Thus, the inner race and the ball have been normally lubricated but damage has occurred in lubricant agent during plastic deformation. No lubrication has been performed during the occurrence of the "dent" (in appearance of friction or adhesion).

Fact 7: The "dent" of the ball had a depth greater than that of the inner race (with both the ball and the inner race colliding at the same relative speed while the ball and the inner race have the nearly equal hardness, the ball and the inner race are deemed to have deformed in the same amounts of deformation but the ball eventually had a larger extent of permanent deformation than that encountered by the inner race).

Consequently, it is deemed that due to the ball encountered with a greater degree of strain than encountered by the inner race, flaking has occurred on the ball. That is, a deviation occurs on a target property between the ball and the inner race due to a difference in orientation of friction $\mu$, a difference in a curvature of a concave and convex shape and a difference in a mass of collision and, so, the ball and the inner race encounter internal strains in different degrees when subjected to the same degree of deformations.

It is needless to say that there is no way for the hydrogen theory and the stress theory to explain such phenomena represented by the seven facts described above. From these facts, the mechanism for the white layer to occur is deemed to be lubrication defect (or adhesion) due to the occurrence of frontal collision between the ball and the inner race in a radial (r) direction with the resultant occurrence of an internal strain in the ball in a plastic region (with strain appeared in the inner race at a level less than that induced in the ball) whereby white-banded flaking has occurred.

Thus, it can be concluded that white-banded flaking encountered on the bearing this time is a result of a plastically instable phenomenon in a high-speed strain that is referred to as an "adiabatic shear deformation band" (otherwise known as a white band) in an impact-processing field. This mechanism is deemed to be based on a sequence, as shown in FIG. 5, wherein as a strain γ and a strain rate $\dot{γ}_c$ exceeding critical values (of the strain $γ_c$ and the strain rate $\dot{γ}$) peculiar to material, occur in a bearing, a relevant portion encounters an adiabatic shear condition with the resultant occurrence of a white layer due to localized rapid heating and rapid quenching.

More particularly, calculated critical values on the strain $\dot{γ}_c$ and the strain rate (strain speed) $\dot{γ}_c$ of commonly used bearing material resulting from calculations conducted by the present inventor have approximate values expressed as $γ_c=0.08$ $\dot{γ}_c=10^2\sim10^4/\text{sec}$ Such a strain rate naturally appears with a load not in a static or dynamic category but in a phenomenon that belongs to a category remaining under an "impact" condition. A physical quantity of stress belongs to a field that should be discussed not in terms of a load but in terms of a colliding speed (m/sec). Such a white band has been revealed in a clear conclusion in that the white band is known as a common sense in the impact-processing field and still involved under a detailed investigation stage on a tissue at a further concrete atomic level.

(With a tissue status in detail still remaining under an investigation stage, no adverse affect occurs on a whole mechanism in actual practice whatever is a tissue of material or whatever the tissue has a grain size.) The present inventor has made calculations on a ball bearing to find out a condition that does not exceed the two critical values set forth above. As a result, it is found out that with a bearing under a normal size, if a colliding speed is less than 1 m/sec (under a 'want' condition), no probability occurs for a strain and a strain rate of the material to exceed the critical values mentioned above and no white-banded flaking takes place in the bearing whereas with the colliding speed substantially higher than 3 to 4 m/sec (with a 'must' condition representing a value greater than 3 m/sec), flaking takes place in the bearing. (In view of an image sense, it can be easily understood that the higher the colliding speed, the greater will be the generated strain γ and strain rate $\dot{γ}_c$.) The inventor has found that the occurrence of such a collision causes an ellipse-shaped dent to be formed and damage occurs on lubrication agent due to a pressure resulting from such collision can be explained by the seven facts as mentioned above. No collision takes place between a rolling body (or rolling element, e.g., ball) and an inner race during a period wherein the rolling body bears a rolling motion in contact with the inner race (or an outer race). Stated another way, this leads to a conclusion that if a contact between the rolling body and the inner race (outer race) is interrupted, that is, when "the rolling body enters a free status for even a moment," a collision occurs between the rolling body and the inner race when these component parts attempt to restore a contact condition again on a subsequent stage.

Some exemplary factors for stress to occur causing the rolling body to fall in a free status may be listed including: deceleration of an engine under which a belt tension becomes negative due to an influence of an inertia force; and a resonance of a belt arising from between an explosion frequency of the engine and a natural vibration frequency of the belt.

For example, with an example of the resonance, suppose the belt has a mass M per unit length, Young's modulus E, a cross-sectional area A, a span length H and a tension T and an auxiliary device (such as, for instance, an alternator) has an inertia moment J and a pulley radius R, natural vibration frequencies (including a lateral vibration $f_1$ and a longitudinal vibration $f_2$) of the belt are expressed as $$f_1 = \frac{1}{2H}\sqrt{\frac{T}{M}} \qquad (1)$$

$$f_2 = \frac{R}{2\pi}\sqrt{\frac{AE}{JH}}. \qquad (2)$$

If the natural vibration frequencies $f_1$ and $f_2$ coincide with explosion components, a resonance occurs on the belt. (It is needless to say that in an actual practice, the longitudinal vibration $f_2$ takes natural values deviated from a value of Equation 2 due to interactions caused by all of pulleys on which a belt is tensioned and has the same number of natural frequencies as the number of pulleys. Equation 2 represents an image formula for representing such a relevant factor.) Although a modern engine employs a serpentine drive system in general practice, a large number of lateral and longitudinal resonant points are present on a bearing of a belt-driven auxiliary device due to the engine and a difference in variation (with T in infinite variation) in load of the auxiliary device and a difference in each span (with H in variation) between pulleys. That is, there is a large risk for brittle flaking to take place in the bearing. Stated another way, the occurrence of brittle flaking tends to vary even if a slight degree of difference exists in recurrence test conditions. With the exemplary test shown in FIG. 2A, while attempt has been made to achieve the recurrence of brittle flaking using the resonance between the lateral vibration frequency $f_2$ of the belt and the motor, it will be appreciated that a colliding phenomenon can be created for other various reasons to eventually cause the occurrence of white-banded flaking. The present inventor has confirmed that with the test machine shown in FIG. 2A, even making attempt to cause a rotational oscillation frequency to be brought into coincidence to the longitudinal vibration frequency $f_2$ of the belt has got a similar consequence with the occurrence of brittle flaking on the bearing. That is, according to the inventor's finding, the bearing suffers from the occurrence of brittle flaking at any time when the rolling body (ball) satisfies a free condition. While the principle has been described above with reference to an example of the ball bearing, it is needless to say that the mechanism may have applications to all types of rolling bearings incorporating rolling bodies such as rolling bearings.

According to such a mechanism, in order to preclude the occurrence of brittle flaking on a bearing, the bearing is sufficed to take a structure so as to preclude the rolling body (a ball or a roller) from falling in a free status (to prevent a rolling contact from being interrupted between the rolling body and the associated stationary component part). However, as far as a belt drive is employed, it is impossible to fully avoid the occurrence of stress as set forth above. Thus, the present inventor has come to a conclusion in that even if stress (that is, resonance) occurs on the bearing causing the rolling body to enter in the free status, the bearing has no space for the rolling body to freely move (with no problem taking place due to a sustained contact between the rolling body and the associated stationary component part even when the rolling body moves in opposite directions).

In light of such understanding, a rolling bearing, adapted for an auxiliary device driven by an internal combustion engine via a belt, comprises an inner race, an outer race and a plurality of rolling elements disposed between the inner race and the outer race for rolling capabilities, with a clearance (a so-called residual clearance) in a radial direction of the rolling bearing between each rolling element and one of the inner race and the outer race laying in a tolerance range, under a status where the rolling bearing is mounted in the auxiliary device, in which a substantially half of the tolerance value falls in a negative value (in other words, to be substantially less than zero at a midpoint of the clearance in the tolerance range in the radial direction).

That is, with the structure set forth above, the rolling body is able to roll under a status with almost no space being present in the radial direction of the rolling bearing for the rolling body to be movable in a free, state causing the occurrence of brittle flaking. Thus, no probability takes place for the rolling body to enter a free status (in out of contact between the rolling body and the associated component part) even when any stress is applied to the bearing from an outside and, hence, no collision takes place (with no occurrence of the rolling contact being brought into contact with the associated component part again), causing no brittle flaking to occur.

With the rolling bearing of the present embodiment, the clearance (the so-called residual clearance) of the rolling bearing in the radial direction thereof, under the status where the rolling bearing is mounted in the auxiliary device, may lie in a negative value or a value equal to or greater than −10 μm and equal to or less than +10 μm in a tolerance range.

With the structure mentioned above, the negative clearance (shrink range) is set to line in the value of −10 μm even in the worst and almost no deterioration in fatigue life takes place with, no occurrence of brittle flaking.

With the rolling bearing of the present embodiment, a single unit of the rolling bearing may have an internal theoretical internal clearance (also referred to as a geometrical clearance) set to the negative clearance. Thus, the radial clearance mentioned above is arranged to fall in the negative value or the value equal to or greater than −10 μm and equal to or less than +10 μm in the tolerance range.

With the structure mentioned above, the internal clearance of the bearing per se is made negative (after assembly of the bearing) to cause the clearance in the radial direction be negative and a shaft of the auxiliary device and a housing are suffice to be maintained in normal dimensions, resulting in simplified assemble of the auxiliary device.

With the rolling bearing of the present embodiment, the rolling bearing may include a shaft supported by rolling bodies, an inner race fixedly secured to the shaft, an outer race held in contact with the inner race by means of the rolling bodies, and a housing encompassing the rolling bodies, the inner race and the outer race. A single piece of the rolling bearing has a radial theoretical internal clearance (geometric clearance) made to include a positive clearance and at lease one of the inner race and the shaft and the outer race and the housing is set to be interference fit or transition fit such that the clearance in the radial direction falls in the negative value or the value equal to or greater than −10 μm and equal to or less than +10 μm in the tolerance range.

With the structure mentioned above, the rolling bearing per se is sufficed to have the normal positive clearance, enabling a usual assembling method to be taken for the rolling bodies to be assembled to the bearing.

With the rolling bearing of the present embodiment, the rolling bearing may include a ball bearing.

With the structure mentioned above, the rolling body may include a ball of a ball bearing frequently used in the auxiliary device and the radial theoretic internal clearance of a single unit can be set in an easy fashion, resulting in reduction in production cost with an increase in durability in rotation at a high speed.

With the present embodiment, the rolling bearing for the auxiliary device may be driven with a belt composed of a V-ribbed belt that is of a serpentine type by which a plurality of auxiliary devices are driven using a single belt.

With the structure mentioned above, no brittle flaking takes place in the rolling bearing even when applied to a drive system such as a serpentine drive system that suffers from complicated stress due to large number of natural vibration frequencies caused by the belt.

With the present embodiment, the auxiliary bearing on which the rolling bearing of the present invention is applied may include an alternator.

That is, with the structure mentioned above, no brittle flaking takes place in the rolling bearing even when applied to the alternator, constituting the most serious application among those of the auxiliary devices, which has the largest inertia moment (=(pulley ratio)$^2$×rotor inertia moment) with an increased amplitude in resonance in the light of the engine having a large rotor inertia moment.

BRIEF DESCRIPTION OF THE DRAWINGS

FIG. 1 is a view illustrating a test condition and a test result plotted in terms of materials of grease.

FIG. 11 is a Table 1 showing a list of greases used in the test.

FIG. 12 is a Table 2 showing an example of radial clearances in a rolling bearing.

FIG. 13 is a Table 3 showing an example of radial clearances in the rolling bearing to which concrete measure has been taken based on the present invention.

DETAILED DESCRIPTION OF PREFERRED EMBODIMENTS

Figure 14:
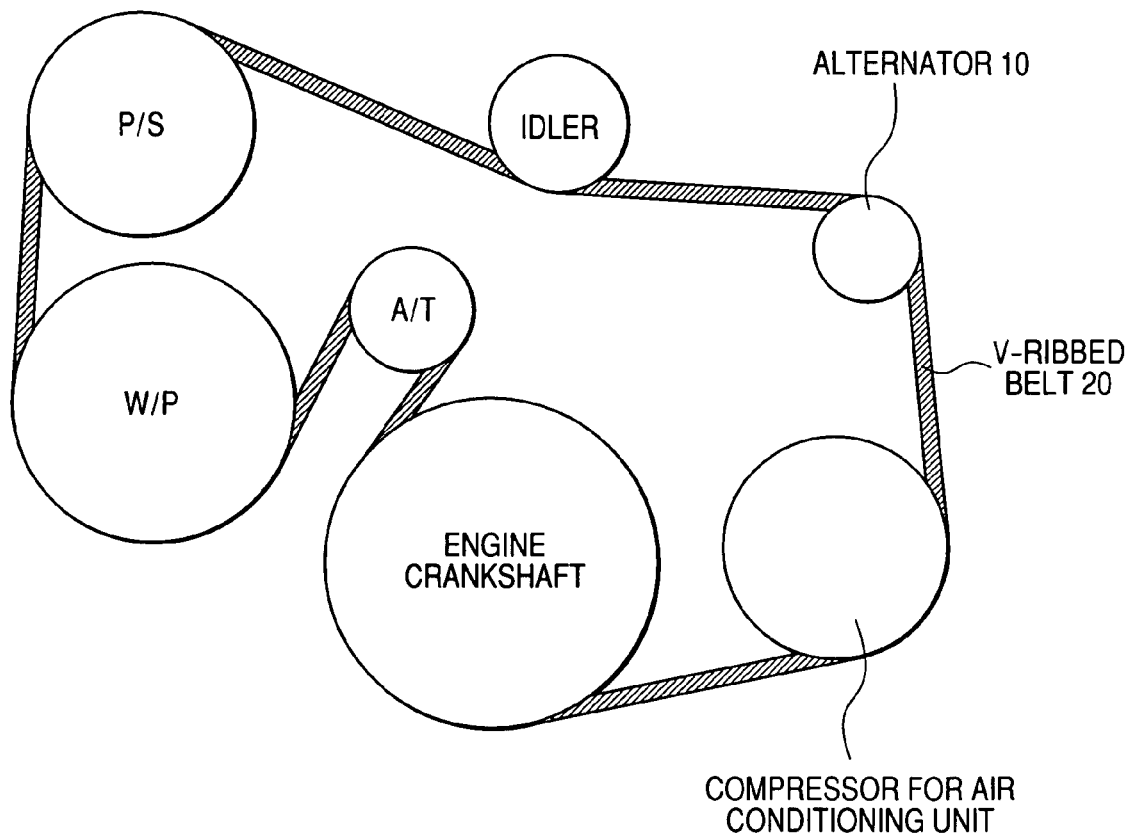
FIG. 14 is a view showing a condition under which an internal combustion engine rotatably drives a plurality of auxiliary devices (including an alternator) by means of a serpentine belt system.

A mechanism for brittle flaking to take place and one embodiment according to the present invention based on such a mechanism are described below in detain. The present embodiment is described with reference to a ball bearing (also referred to as a ball or bearing) as an example of a rolling bearing. That is, in order for a ball and an inner race (or an outer race) to collide each other in the most effective way, it is natural for the ball and the inner race to collide each other in a radial direction and, therefore, description is made of a structure shown in FIGS. 6A and 6B. The ball bearing, shown in FIGS. 6A and 6B, for use in an auxiliary device is used as a bearing for an alternator (AC generator) 10 (see FIG. 10) that is rotatably driven with, for instance, an engine (internal combustion engine). The bearing includes a rotary shaft 4, an inner race 2 fixedly secured onto the rotary shaft 4, an outer race 3 held in contact with the inner race 2 by means of balls 1, and a housing 5 by which the balls 1, the inner race 2 and the outer race 3 are covered. The alternator 10 plays a role as one of a plurality of auxiliary devices that are rotatably driven through a single V-ribbed belt tensioned in a serpentine method shown in FIG. 14.

Figure 6A:
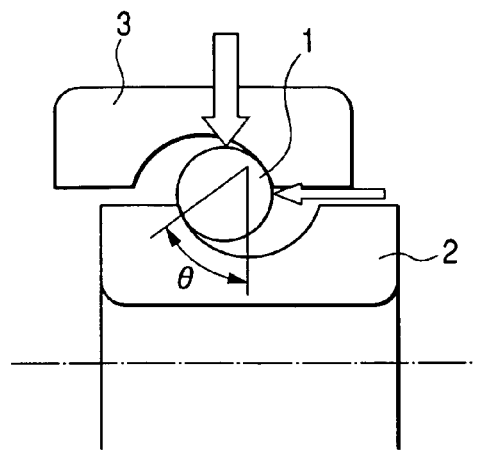
FIGS. 6A and 6B are views for illustrating the mechanism for the occurrence of brittle flaking.
Figure 6B:
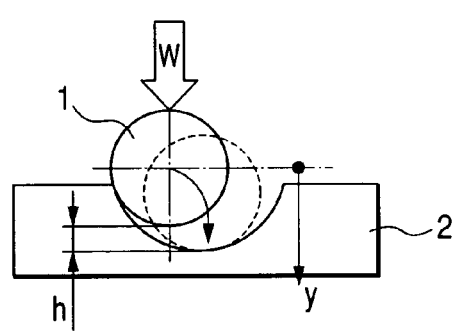

FIG. 6A shows a status wherein radial load and thrust load act on the inner race 2 of the ball bearing 1 (also referred to as the ball 1) from the outer race 3 in directions as shown by outline arrows (with load similarly acting not from the outer race 3 but from the inner race 2 in a relative manner). FIG. 6B is an enlarged view showing how the ball 1 and the inner race 2, shown in FIG. 6A, are held in contact with each other. The ball 1 is held in contact with the inner race 2 at a point displaced from a center of the inner race 2 by an angle θ to cause the ball 1 to stay in a position higher than a bottom of a bearing ring of the inner race 2 by a value of h. (It is needless to say that thrust load may not be of the type that is forcedly applied as a pressurized factor but may include a thrust component resulting from an inclined axis due to radial load. The point is that anything is sufficient provided that the ball 1 is displaced from the center of the inner race 2.)

Suppose load, greater than thrust load, acts on the inner race 2 in opposition to thrust load due to some reason (such as vibration in an axial direction from, for instance, an engine that is not shown) under such a contacted condition, the ball 1 is caused to move into collision with the bearing ring of the inner race 2 describing a parabolic arch as shown by an arrow in FIG. 6A. In this case, depending on conditions of thrust load acting in the opposite direction, the ball 1 is brought into collision with the bottom of the bearing ring (in displacement by a height h). Assuming a mass of the ball 1 is designated to be m, an equation of motion is expressed as $$m\ddot{y}=W \quad (3).$$

If the ball 1 drops by a height h, then, the resulting colliding speed Vo is expressed by $$v_0 = \sqrt{\frac{2hW}{m}}. \quad (4)$$

For example, suppose a ball bearing of a size 6202 has a radial clearance in the order of 10 μm, a ball drops in a distance by such an amount h in a maximal extent and, hence, with W=60 Kg and m=0.9 g, the colliding speed Vo is expressed as Vo=3.6 m/sec. Accordingly, such a case results in a consequence to meet an adiabatic shear condition (3 m/sec under 'must' condition), causing brittle flaking to possibly take place in actual practice.

It is needless to say that Equation 4 can be applied (not only in a case where a contact point is deviated by a value φ at the beginning but also) even if the ball 1 enters a free state due to some reasons to have potential energy of the height h. For example, a probability occurs for a belt to have a tension in a negative value for a moment during deceleration of an engine as experienced in the serpentine drive system. At this moment, no consequence occurs for load to absolutely act on the ball 1 and the ball 1 breaks off contact with the inner race 2 and the outer race 3 after which load is imparted to the ball 1 again during an end of deceleration, causing the ball 1 to encounter a collision. In addition, although various probabilities are conceived to cause the ball 1 to encounter a colliding speed, it is found out that at any rate, the colliding speed exceeding a value of Vo=1 m/sec falls in a critical area.

While the exemplary case, shown in FIGS. 6A and 6B, has been mentioned with reference to assumption that the ball1 encounters frontal collision in the radial direction of the inner race 2, this assumption is correct in almost cases. That is, in normal practice, since the ball 1 rolls in a continuous manner with no possible slip relative to the inner race 2, it is no wonder for the ball 1 and the inner race 2 to have completely identical absolute speeds in a rotational direction at the resulting contact point. Accordingly, even if the ball 1 enters a free state (with a speed in a radial direction) due to some stresses by any chance, the speed in the rotational direction does not change. Therefore, no difference exists in speed between the ball 1 and the inner race 2 even when the ball 1 is brought into contact with the inner race 2 due to collision again. This results in collision in the form of frontal collision in a radial direction (in the same way as that of a case in which the ball 1 collides with the outer race 3). That is, in an event that the ball 1 becomes free, an increased risk takes place for the collision to result in adiabatic shear condition.

Figure 2A:
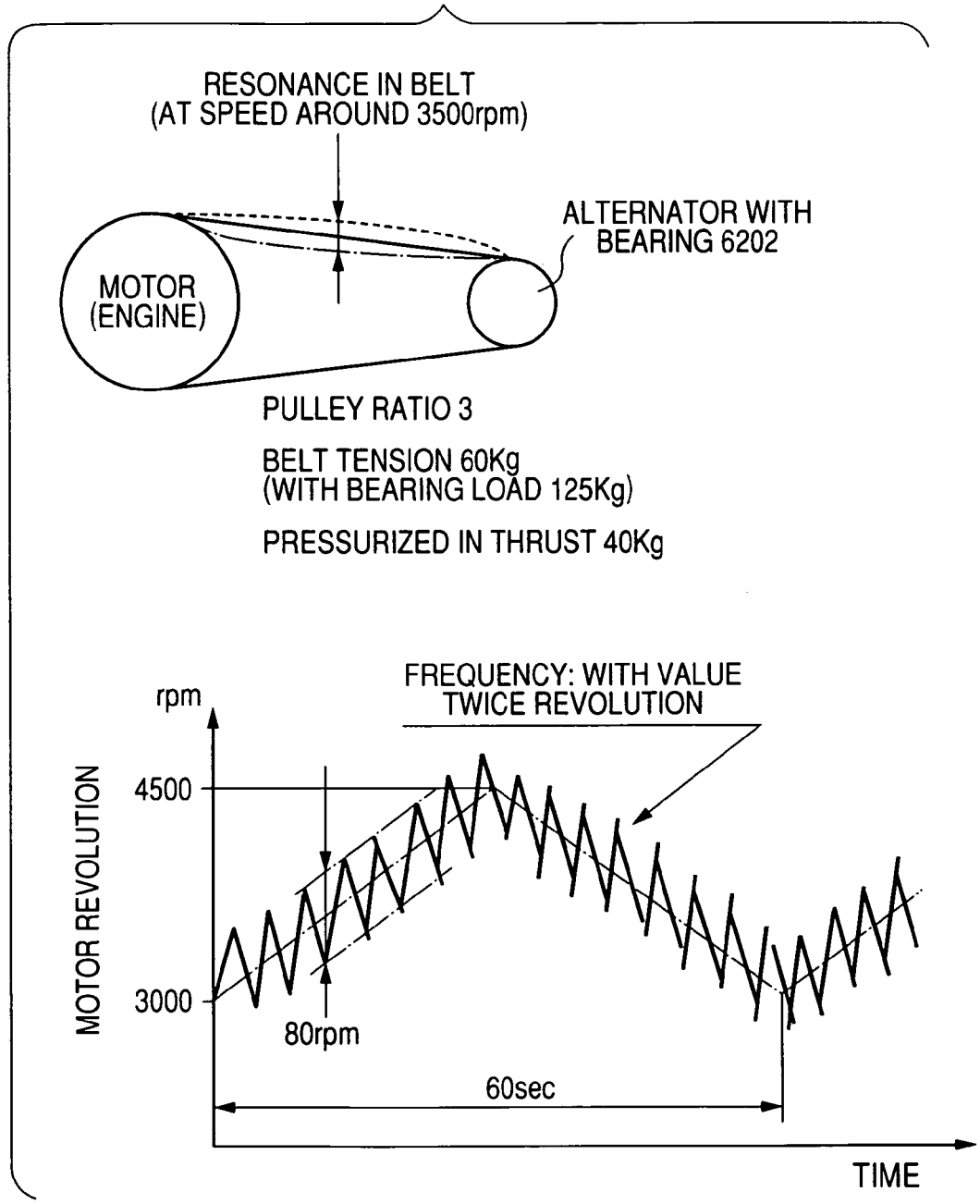
FIG. 2A is a view showing a test method for recurrence test of brittle flaking on a bearing.
Figure 2B:
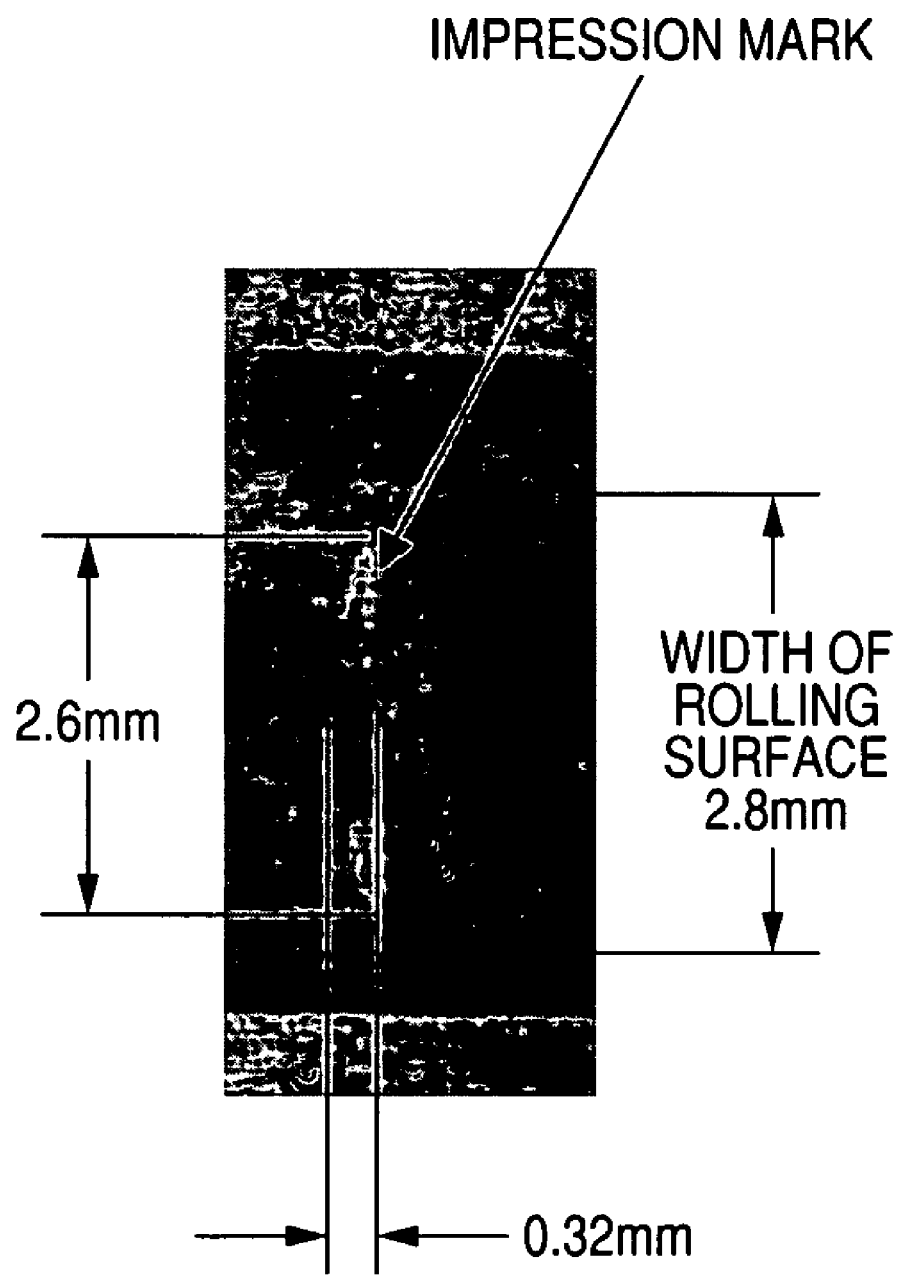
FIG. 2B is a view showing a test result of the bearing.
Figure 3A:
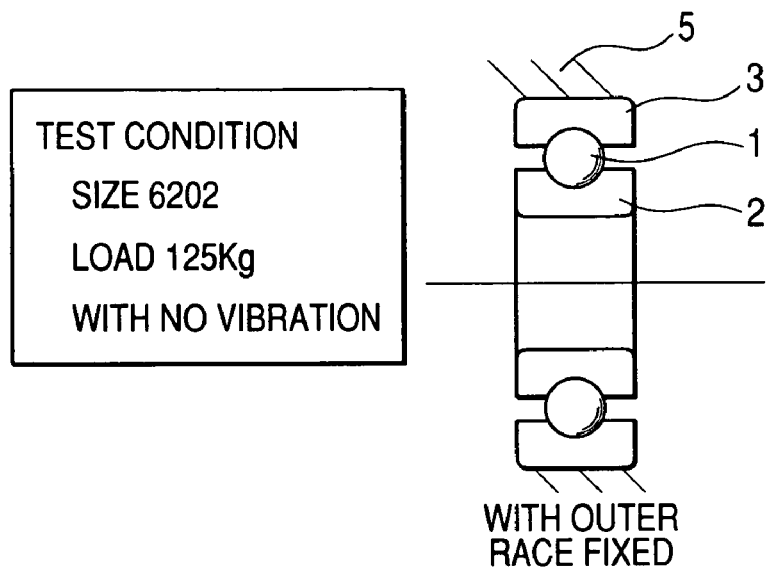
FIG. 3A shows a detailed structure of the test result shown in FIG. 2B.
Figure 3B:
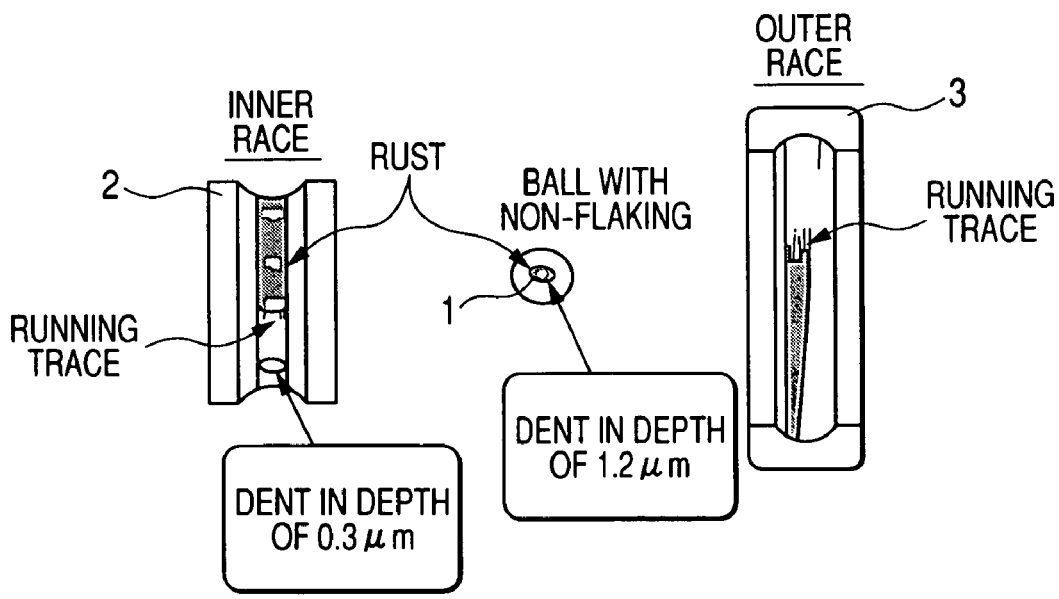
FIG. 3B is an exploded view of the bearing shown in FIG. 3A.
Figure 4:
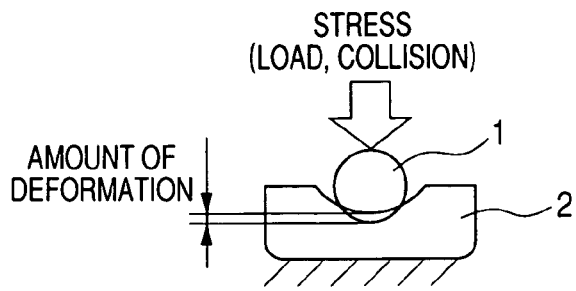
FIG. 4 is an image view showing a contact condition between a ball and an inner race.
Figure 5:
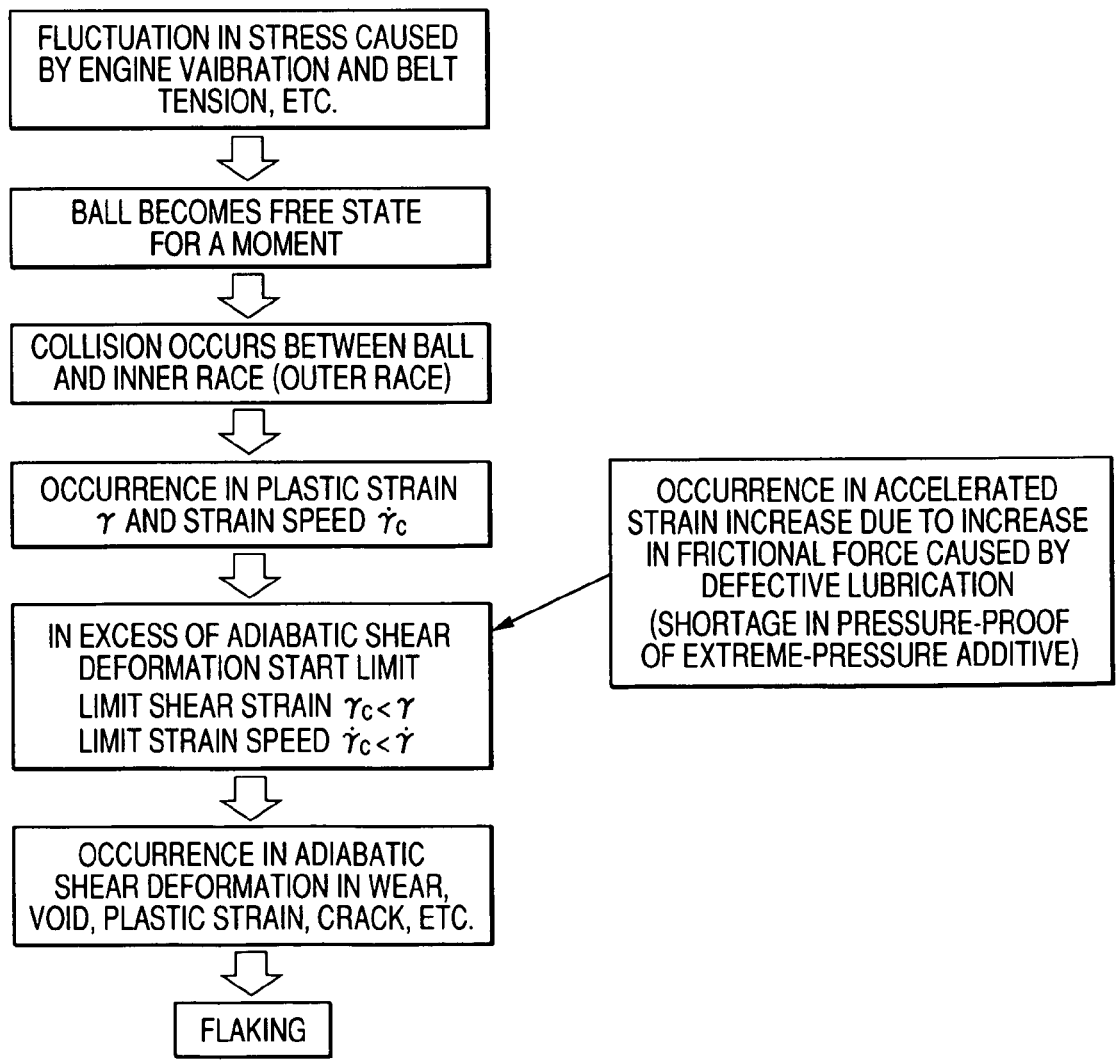
FIG. 5 is a view showing a mechanism, in which brittle flaking occurs, resulting from the result of the present invention.
Figure 10:
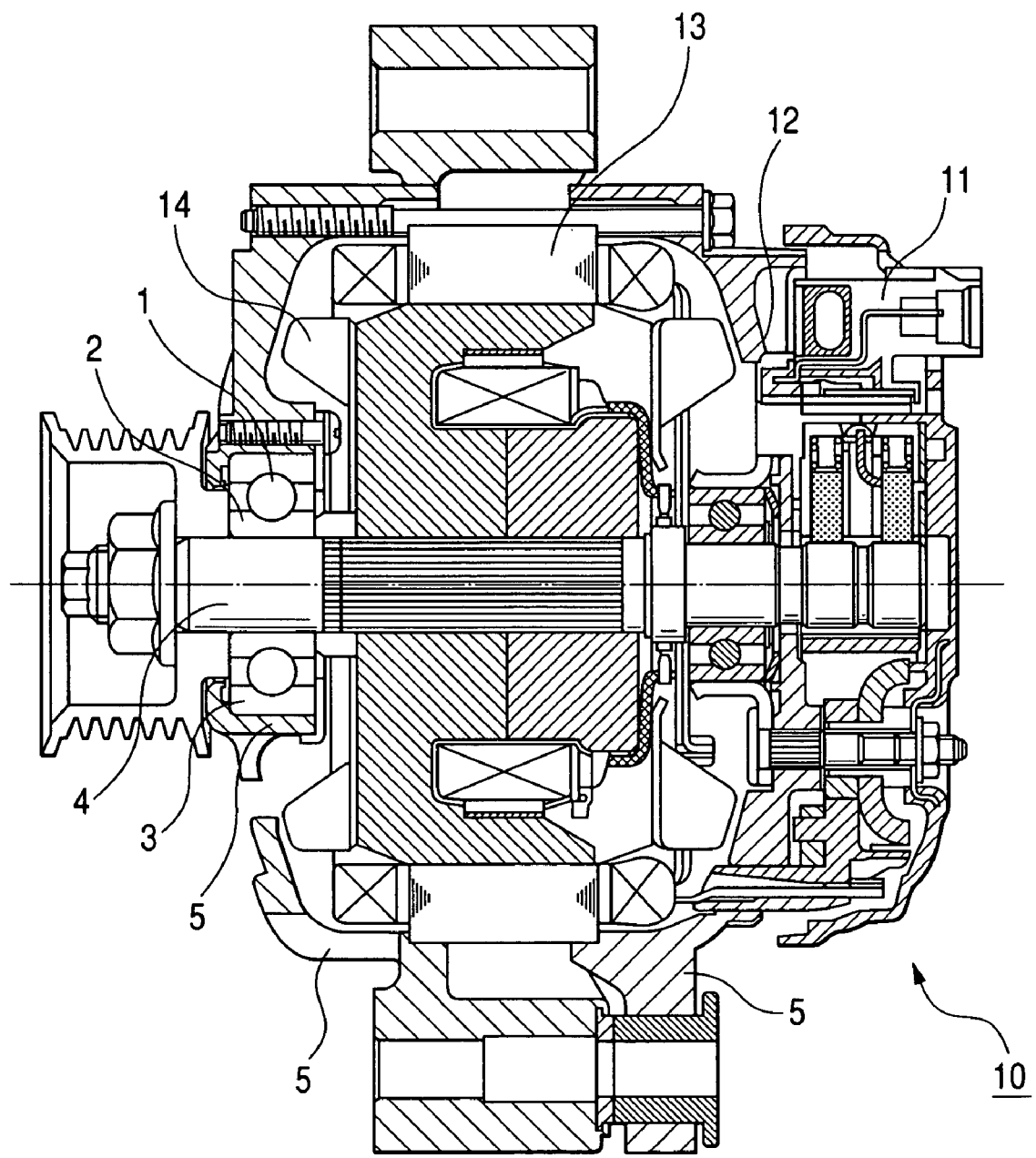
FIG. 10 is a cross-sectional view showing an alternator incorporating a bearing of an embodiment according to the present invention.

FIG. 12 is a table 2 showing various dimensional parameters related to a clearance as viewed in a radial direction in terms of a tolerance range on an actual dimension in case of the exemplary case of the alternator 10 shown in FIGS. 2 and 10 (Calculation formulae for mating margin between inner and outer races and clearances between associated component parts are introduced in common books and herein omitted. However, it should be appreciated that a housing 5 is made of aluminum.)

Figure 7A:
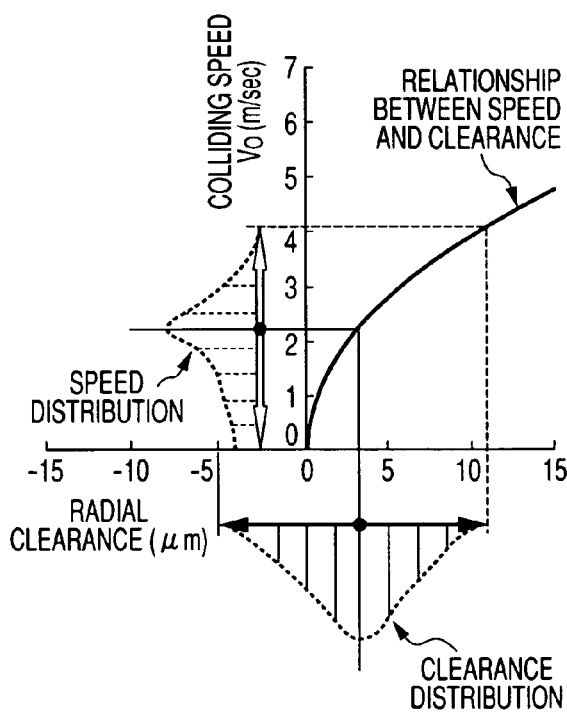
FIGS. 7A and 7B are views showing the relationship between a colliding speed and a radial clearance in a dimensional tolerance of the related art.
Figure 7B:
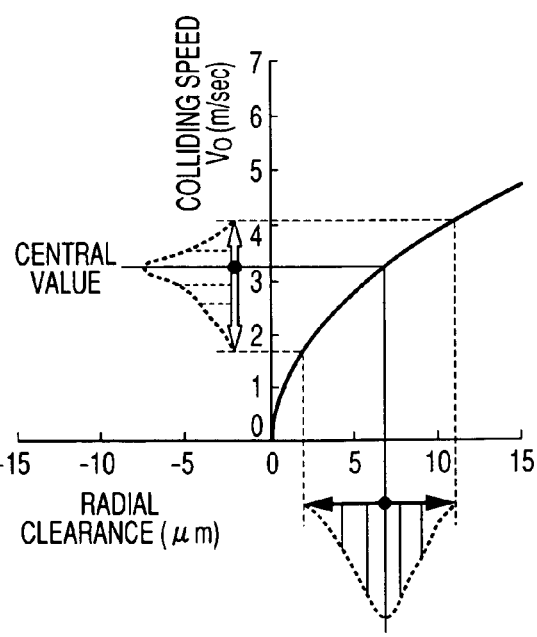

FIGS. 7A and 7B are graphs showing variation in a colliding speed in terms of a radial clearance present after assembly (see the equation 4 with load of W=68 Kg that is equivalent to bearing load shown in FIG. 2A). FIG. 7A shows the graph of the relationship between the colliding speed and the radial clearance of the bearing at normal temperatures and FIG. 7B shows the graph of the relationship between the colliding speed and the radial clearance of the bearing at high temperatures.

In particular, FIG. 7B demonstrates that the colliding speed Vo lies in a value ranging from 1.8 to 4.1 (in weighted average efficiency of 3.2) m/sec in correspondence to a clearance of 6.5±4.5 μm (under normal distribution in FIG. 7A). That is, under the high temperature conditions, not only the colliding speed exceeds a 'want' condition (1 m/sec) with no occurrence of adiabatic shear but also exceeds 'must' condition (3 m/sec) in average. This means that if the ball 1 enters the free state upon receipt of some stress, more than half of balls undergoes a risk of the occurrence of brittle flaking. Such a trend appears with the ball even at normal temperatures (see FIG. 7A), although the trend is not significant compared with that appearing at the high temperatures.

As will be understood from FIGS. 7A and 7B, in order to avoid the occurrence of white-banded flaking (in order to lower a colliding speed), a radial clearance of the bearing after assembly may be sufficed to be equal to or less than 0 μm. That is, among the dimensional parameters represented in Table 2, an internal clearance of the bearing per se is merely altered from a value of 11 to 4 μm to a value of 0 to −7 μm (negative clearance) upon which the radial clearance may fall in values of 0 to −16 μm at normal temperatures and 0 to −9 μm at high temperatures with no change in other dimensions. With such radial clearance, the colliding speed is zeroed (under which no clearance is present and no interrupted contact happens between the ball and the inner race even when applied with any stress) as understood from FIGS. 7A and 7B, causing no brittle flaking (white-banded flaking) to take place.

Figure 8:
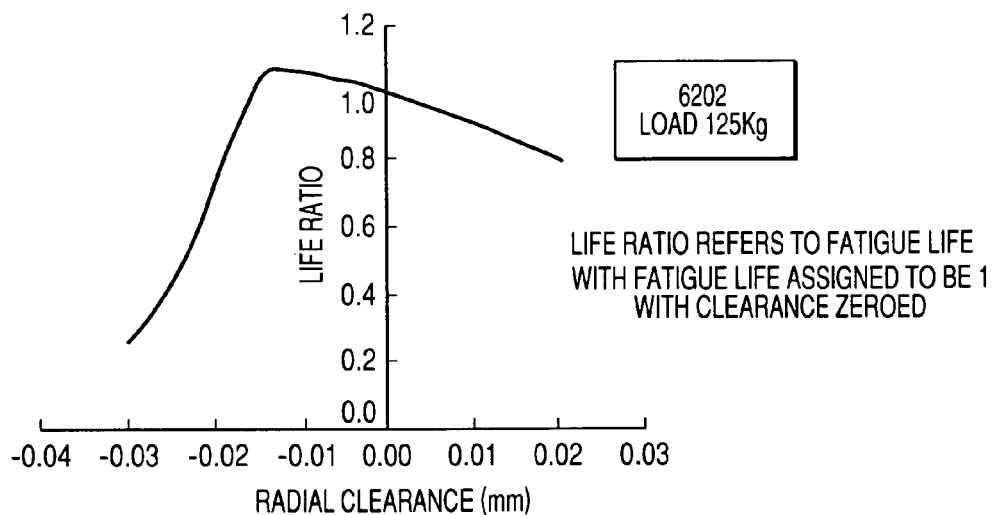
FIG. 8 is a view representing the relationship between a residual clearance and a fatigue life.

However, as shown in FIG. 8, if the radial clearance falls in an extremely negative clearance, a remarkable drop occurs in a fatigue life and, hence, the radial clearance requires special attention. (In FIG. 8, a graph demonstrates that as the radial clearance falls in a negative clearance at a value beyond —13 μm, a remarkable drop occurs in a fatigue life to encounter an increased risk. Such an inflection point also varies depending on loads. Moreover, as used herein, the term "fatigue life" refers to a fatigue life appearing when a fatigue life with a clearance of "0" is regarded to be "1"). With the present example (with the radial clearance of −16 μm), the radial clearance requires special attention at the normal temperatures but, in actual practice, as the alternator begins to generate electric power, the temperatures of the bearing increase and the radial clearance shifts to a safety side. However, it will be readily understood that although such a method causes the radial clearance to fall in the negative clearance when the ball is assembled into between the inner and outer races and has a drawback with the occurrence of difficulties in manufacturing steps, such a method is quite effective to eliminate white-banded flaking from occurring in the bearing.

As a result of further studies conducted by the present inventor, it has been found that although it is ideal to satisfy a 'want' condition for adiabatic shear, no practical issue arises even when the colliding speed satisfies the 'must' condition for two reasons in which: materials actually used in a normal bearing satisfies a colliding speed less than 'must' condition for adiabatic shear and have no issues in effect; and an occurrence frequency of stress by which the ball enters the free status is low and even when the ball enters the free status, the bearing has a low probability (of ⅛ with the bearing of the present example, mentioned above, incorporating 8 pieces of balls) in which the ball in free status is aligned with a direction in which the radial clearance takes the maximum level.

Further, the radial clearance of the bearing after assembly thereof represents no worst combination as indicated in Table 2 and may have a slightly increased tolerance upon further studies being conducted from the statistical viewpoint.

More particularly, suppose an outer race diametric tolerance is $\Delta D_1$, a housing diametric tolerance is $\Delta D_2$ an inner race diametric tolerance is $\Delta d_1$, a rotary shaft diametric tolerance is $\Delta d_2$ and a bearing internal clearance tolerance is AC, a radial clearance width (tolerance) RC of the bearing after assembly in Table 2 is expressed as $$RC = \Delta D_1 + \Delta D_2 + \Delta d_1 + \Delta d_2 + \Delta C \quad (5).$$

(Also, such a radial clearance tolerance RC is not equivalent to a value as a result of a simplified accumulation of tolerances due to differences in interference fit and running fit in actual practice (while if all of component parts are fitted under interference fit, such a radial clearance tolerance RC can be expressed by equation 5 described above).

With a method of least squares in statistics, an assembling tolerance Δ is given by $$\Delta = k\sqrt{\Delta D_1^2 + \Delta D_2^2 + \Delta d_1^2 + \Delta d_2^2 + \Delta C^2} \quad (6),$$

where k represents a safety coefficient (of 1.5 in normal practice) depending on the increasing weight of a component part.

Actually executing calculation based on the example of Table 2(with $\Delta D_1$=11, $\Delta D_2$=16, $\Delta d_1$=8, $\Delta d_2$=8 and $\Delta C$=7)

From Equation 6 Assembling Tolerance=50 μm

From Equation 6 Δ=36 μm

That is, the assembling tolerance marks a value of approximately 70% (=36/50) in statistics in contrast to the accumulated (worst) tolerance resulting from single part tolerances. Stated another way, with a real engine, in case of making judgment using a value of the clearance in the worst combined tolerance, as represented in Table 2, and the 'must' condition (3 m/sec), it may be appropriate to see that the 'must' condition in appearance is improved to a value of 4 m/sec (also, since a recurrence test is set on a bench as shown in FIG. 2A so as to allow the bearing to be forcedly applied with stress at all times and a stress frequency is established at a rate of 100%, judgment may be preferably made not based on a value of 4 m/sec but based on a value of 3 m/sec).

As set forth above, the present inventor has reached a conclusion in that in order to have a substantial effect, the radial clearance does not necessarily need to be negative in an entire area of the tolerance range. Examples of concrete measures will be described below with reference to Table 3 show in FIG. 13. Table 3 shows various altered dimensional parameters (with the same tolerance ranges as those of the simple unit) in contrast to the various dimensional parameters shown in Table 2 under which the bearing has encountered the white-banded flaking in the recurrence test. That is, an interfit margin at an outer race portion is dimensioned in a direction to increase a clearance; an interfit margin at an inner race portion is dimensioned in a direction to cause interference fit (in transition fit in actual practice); and an internal clearance of a single bearing is reduced dimension (with a positive clearance to provide production ability). As a result, a radial clearance of a bearing after assembly could have approximately the same positive and negative values both at the normal temperatures and high temperatures.

Figure 9A:
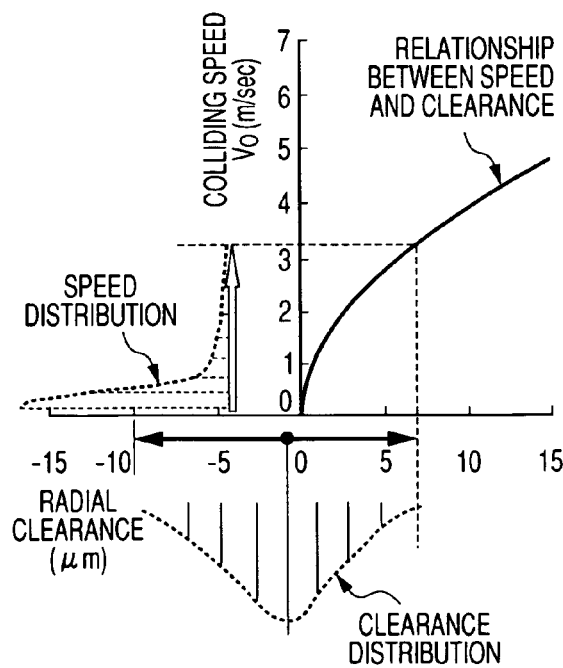
FIGS. 9A and 9B are views showing a result of a bearing according to the present invention under the relationship between a colliding speed and a radial clearance in a dimensional tolerance specified according to the present invention.
Figure 9B:
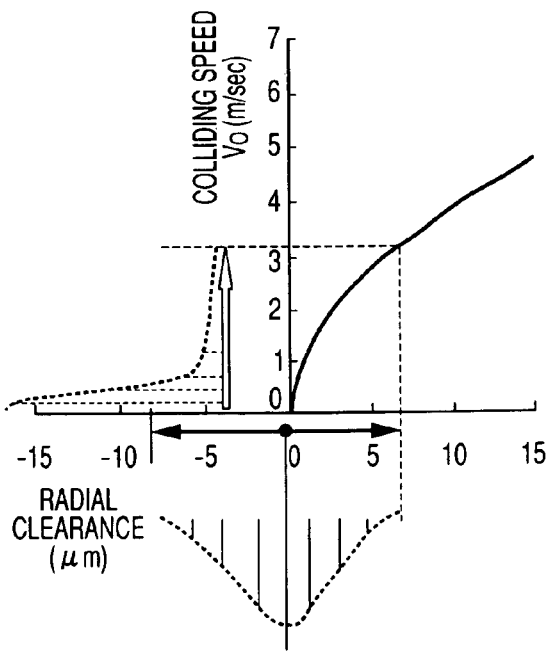

FIGS. 9A and 9B are graphs each showing the relationship between a colliding speed of a ball and an inner race of a bearing incorporated in an alternator under specifications shown in Table 3 at normal temperatures and high temperatures. In these graphs, the colliding speeds have speed distribution patterns in which each central value is zeroed. It is apparent that a major portion of the colliding speed satisfies the 'must' condition and, of course, lies in a value below the 'want' condition. Adding the statistic story discussed above gives an analogy in that no risk of the occurrence of flaking occurs even on the recurrence test on the bench (see FIG. 2A) applied with forced stress at all times. The test in FIG. 2A was carried out under the specification shown in Table 3 but no white-banded flaking was observed.

As a result of tests conducted by the present inventor under other conditions, it is concluded that in case of the colliding speed with an average value (a central value of a tolerance of the radial clearance of the bearing after assembly) falling in a value less than the 'want' condition (1 m/sec), no adverse affect is present. That is, under a condition where at least nearly half of the tolerance ranges in the radial clearance (residual clearance) with the ball bearing 1 being mounted to the alternator 10 is maintained to be negative (in so-called interference), no white-banded flaking takes place in actual practice. Moreover, since the ball bearing 1 remains under an appropriate negative clearance in contrast to the bearing of the related art remaining under a positive clearance, the ball bearing 1 has an increased fatigue life as will be understood from FIG. 8. In addition, no attempt has been made in a bearing of the related art for an auxiliary device, like an alternator, in which heat remarkably develops during operations (to generate electric power) in a way to cause the bearing to have a tolerance range a half of which is set to be negative (as represented in Table 2) while enhancing a residual clearance in a wide area ranging from normal temperatures to high temperatures. On the contrary, upon turning such a drawback (with an increase in heat) to an advantage, the present inventor effectively utilizes a characteristic in that even if the ball bearing is set to have a clearance with a negative value in a maximum extent at normal temperatures, the negative clearance of the ball bearing decreases at high temperatures to be apart from a risk area of the fatigue life.

Also, the present has conceived a point in that a single ball bearing unit, which is usually arranged to ensure an internal clearance greater than 4 μm, is set to a value greater than 0 μm (with a clearance CM being altered to clearances C1 or C2 in an example of an alternator). Even with a bearing of a size other than that of FIG. 2A under other load, if a rolling bearing is set to have an internal clearance equal to or greater than −10 μm and equal to or less than +10 μm, then, the rolling bearing is able to ensure an extended fatigue life while enabling suppression of the occurrence of white-banded flaking. Moreover, it is needless to say that the present invention may have applications to a whole of rolling bearings of other auxiliary devices mounted on an engine other than the alternator.

As set forth above, with the present invention by which a clear mechanism is established with the resultant clarity in a critical value for avoiding the occurrence of brittle flaking to enable design study in advance, no need arises for taking an woefully inefficient method that needs to confirm the critical value upon numerous tests randomly conducted on real machines as done in the related art practice. Also, since the test result can be judged in the light of the mechanism with fewer occurrences of mistakes. Additionally, no need arises for the ball bearing to be formed in an unnecessarily large size and unnecessarily high precision. That is, with the present invention using a scheme of the negative clearance, no probability takes place for an adiabatic shear deformation of a rolling element to exceed a critical value even if the rolling element enter a free state. This results in an excellent advantages effect with no occurrence of white-banded flaking (brittle flaking) in a rolling bearing used under various environments such as serpentine drive with various stresses.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

What is claimed is:

1. A rolling bearing which is adapted for a desired auxiliary device employed in a belt-driving system in which the desired auxiliary device is selected from a plurality of auxiliary devices mounted on a vehicle with an internal combustion engine generating a driving power and driven in common by the internal combustion engine via a single belt transmitting the driving power to the plurality of auxiliary devices, the rolling bearing comprising:
   an inner race,
   an outer race, and
   a plurality of rolling elements disposed between the inner race and the outer race for rolling capabilities,
   wherein an internal clearance among the inner race, the outer race, and each of the plurality of rolling elements in a radial direction of the rolling bearing is set to a first value before the rolling bearing is mounted into the desired auxiliary device and the internal clearance is set to a second value after the rolling bearing is mounted into the desired auxiliary device, the second value being smaller than the first value, and
   the internal clearance obtained after the rolling bearing is mounted in the desired auxiliary device has a tolerance value that is less than half of the difference between the first value and the second value in the radial direction after the rolling bearing is mounted into the desired auxiliary device.

2. The rolling bearing according to claim 1, wherein the first value is a negative value.

3. The rolling bearing according to claim 2, wherein the tolerance value of the internal clearance obtained after the rolling bearing is mounted in the desired auxiliary device falls into a range of from −10 μm to +10 μm.

4. The rolling bearing according to claim 3, wherein the rolling elements are a plurality of ball bearings.

5. The rolling bearing according to claim 4, wherein the desired auxiliary device is an alternator mounted on the vehicle.

6. The rolling bearing according to claim 1, further comprising:
   a shaft supported by the rolling elements, wherein the inner race fixedly being secured to the shaft, the outer race being held in contact with the inner race by means of the rolling elements; and
   a housing encompassing the rolling elements, the inner race and the outer race,
   wherein the first value is a positive value and at least one of a first pair of the inner race and the shaft and a second pair of the outer race and the housing is set to be interference fit or transition fit so that the internal clearance is set to a negative value after the rolling bearing is mounted into the desired auxiliary device.

7. A belt-driving system, comprising:
   a plurality of auxiliary devices mounted on a vehicle with an internal combustion engine generating a driving force;
   a single belt transmitting the driving power to the plurality of auxiliary devices such that the plurality of auxiliary devices are driven in common by the driving force; and
   a rolling bearing loaded in a desired auxiliary device belonging to the plurality of auxiliary devices such that the rolling bearing transmits the driving power to the desired auxiliary device,
   the desired auxiliary device comprising an inner race, an outer race, and a plurality of rolling elements disposed between the inner race and the outer race for rolling capabilities,
   wherein an internal clearance among the inner race, the outer race, and each of the plurality of rolling elements in a radial direction of the rolling bearing is set to a first value before the rolling bearing is mounted into the desired auxiliary device and the internal clearance is set to a second value after the rolling bearing is mounted into the desired auxiliary device, the second value being smaller than the first value, and
   the internal clearance obtained after the rolling bearing is mounted in the desired auxiliary device has a tolerance value that is less than half of the difference between the first value and the second value in the radial direction after the rolling bearing is mounted into the desired auxiliary device.

8. The belt-driving system according to claim 7, wherein the first value is a negative value.

9. The belt-driving system according to claim 8, wherein the tolerance value of the internal clearance obtained after the rolling bearing is mounted in the desired auxiliary device falls into a range of from −10 µm to +10 µm.

10. The belt-driving system according to claim 7, further comprising:
   a shaft supported by the rolling elements, wherein the inner race fixedly being secured to the shaft, the outer race being held in contact with the inner race by means of the rolling elements; and
   a housing encompassing the rolling elements, the inner race and the outer race,
   wherein the first value is a positive value and at least one of a first pair of the inner race and the shaft and a second pair of the outer race and the housing is set to be interference fit or transition fit so that the internal clearance is set to a negative value after the rolling bearing is mounted into the desired auxiliary device.

11. The belt-driving apparatus according to claim 10, wherein the belt is composed of a V-ribbed belt that is a serpentine type drive by which the plurality of auxiliary devices are driven using a single belt composed of the V-ribbed belt.

12. The belt-driving apparatus according to claim 11, wherein the rolling elements are a plurality of ball bearings.

13. The rolling bearing according to claim 12, wherein the desired auxiliary devices is an alternator mounted on the vehicle.

* * * * *